(12) United States Patent
Tanaka et al.

(10) Patent No.: US 7,956,513 B2
(45) Date of Patent: Jun. 7, 2011

(54) METHOD OF DRIVING A DRIVING DEVICE

(75) Inventors: Toyoki Tanaka, Kanagawa (JP); Soumei Takahashi, Tokyo (JP); Takahiko Nishiyama, Kanagawa (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 253 days.

(21) Appl. No.: 12/148,253

(22) Filed: Apr. 17, 2008

(65) Prior Publication Data

US 2008/0265806 A1    Oct. 30, 2008

(30) Foreign Application Priority Data

Apr. 20, 2007  (JP) .................................. 2007-112090

(51) Int. Cl.
*H01L 41/107* (2006.01)
(52) U.S. Cl. .................. 310/317; 310/318; 318/116
(58) Field of Classification Search .................. 310/317, 310/318; 318/116
See application file for complete search history.

(56) References Cited

U.S. PATENT DOCUMENTS

| | | | |
|---|---|---|---|
| 3,941,903 A | | 3/1976 | Tucker |
| 4,065,212 A | * | 12/1977 | Belleson et al. ............. 356/398 |
| 4,786,836 A | | 11/1988 | Tokushima |
| 4,830,500 A | | 5/1989 | Kuroki et al. |
| 5,225,941 A | | 7/1993 | Saito et al. |
| 5,442,166 A | | 8/1995 | Hollmann |
| 5,589,723 A | | 12/1996 | Yoshida et al. |
| 5,821,441 A | | 10/1998 | Kawamura |
| 5,890,391 A | * | 4/1999 | Okada .............................. 74/128 |
| 6,084,363 A | * | 7/2000 | Mizumoto .................... 318/116 |
| 6,111,336 A | * | 8/2000 | Yoshida et al. ............... 310/328 |
| 6,114,799 A | | 9/2000 | Yoshida et al. |
| 6,140,750 A | | 10/2000 | Ueyama |
| 6,188,161 B1 | * | 2/2001 | Yoshida et al. ............... 310/328 |
| 6,232,697 B1 | | 5/2001 | Mizumoto |
| 6,392,827 B1 | | 5/2002 | Ueyama et al. |

(Continued)

FOREIGN PATENT DOCUMENTS

DE                 36 37 930 A          4/1992

(Continued)

OTHER PUBLICATIONS

U.S. Appl. No. 12/082,939, filed Apr. 15, 2008, Entitled "Driving Device Capable of Obtaining a Stable Frequency Characteristic" Inventor: Takahashi et al.

(Continued)

*Primary Examiner* — Walter Benson
*Assistant Examiner* — Bryan P Gordon
(74) *Attorney, Agent, or Firm* — Holtz, Holtz, Goodman & Chick, PC

(57) ABSTRACT

A driving device includes an electro-mechanical transducer having first and second end portions opposite to each other in an expansion/contraction direction, a stationary member coupled to the first end portion of the electro-mechanical transducer, a vibration friction portion mounted to the second end portion of the electro-mechanical transducer, and a moving portion frictionally coupled to the vibration friction portion, whereby moving the moving portion in the expansion/contraction direction of the electro-mechanical transducer. The moving portion is driven by equalizing a constant expanding speed of the electro-mechanical transducer with a constant contracting speed of the electro-mechanical transducer and by setting a constant rest time interval after one of contraction of the electro-mechanical transducer and expansion of the electro-mechanical transducer.

4 Claims, 9 Drawing Sheets

U.S. PATENT DOCUMENTS

| | | | |
|---|---|---|---|
| 6,492,637 | B1 | 12/2002 | Fujita |
| 6,528,926 | B2 | 3/2003 | Okamoto et al. |
| 6,705,696 | B1 * | 3/2004 | Okuda et al. ............... 347/11 |
| 6,856,072 | B2 | 2/2005 | Kosaka et al. |
| 7,157,830 | B2 | 1/2007 | Jansson et al. |
| 7,173,363 | B2 | 2/2007 | Hendriks et al. |
| 7,199,506 | B2 | 4/2007 | Sasaki et al. |
| 7,271,522 | B2 | 9/2007 | Yuasa et al. |
| 7,342,347 | B2 | 3/2008 | Magnussen et al. |
| 7,355,325 | B2 | 4/2008 | Johansson et al. |
| 7,355,802 | B2 | 4/2008 | Homme |
| 7,368,854 | B2 | 5/2008 | Manabe |
| 7,433,138 | B2 | 10/2008 | Sasaki |
| 7,466,949 | B2 | 12/2008 | Satoh et al. |
| 7,531,941 | B2 | 5/2009 | Manabe |
| 2002/0038988 | A1 | 4/2002 | Matsuo et al. |
| 2002/0109434 | A1 | 8/2002 | Seki |
| 2004/0000903 | A1 | 1/2004 | Morimoto |
| 2004/0216589 | A1 | 11/2004 | Amick |
| 2005/0127789 | A1 | 6/2005 | Magnussen et al. |
| 2005/0242688 | A1 | 11/2005 | Yuasa et al. |
| 2005/0275315 | A1 | 12/2005 | Manabe et al. |
| 2006/0103266 | A1 | 5/2006 | Okamoto |
| 2006/0238075 | A1 | 10/2006 | Manabe et al. |
| 2007/0036533 | A1 | 2/2007 | Sasaki |
| 2007/0036534 | A1 | 2/2007 | Sasaki et al. |
| 2007/0075610 | A1 | 4/2007 | Manabe et al. |
| 2007/0096601 | A1 | 5/2007 | Sueyoshi et al. |
| 2008/0196815 | A1 | 8/2008 | Yamada et al. |
| 2009/0027785 | A1 | 1/2009 | Tanaka et al. |
| 2009/0146602 | A1 | 6/2009 | Kikuchi et al. |

FOREIGN PATENT DOCUMENTS

| | | |
|---|---|---|
| EP | 1 605 290 A2 | 12/2005 |
| EP | 1 755 176 A2 | 2/2007 |
| EP | 1 845 607 A | 10/2007 |
| JP | 6-174999 A | 6/1994 |
| JP | 7-49442 A | 2/1995 |
| JP | 2633066 B2 | 4/1997 |
| JP | 9-191665 A | 7/1997 |
| JP | 10-023771 A | 1/1998 |
| JP | 10-337057 A | 12/1998 |
| JP | 3002890 B2 | 11/1999 |
| JP | 3141714 B2 | 12/2000 |
| JP | 3171000 B2 | 3/2001 |
| JP | 3180557 B2 | 4/2001 |
| JP | 3212225 B2 | 7/2001 |
| JP | 3218851 B2 | 8/2001 |
| JP | 2003-185406 A | 7/2003 |
| JP | 2005-218244 A | 8/2005 |
| JP | 2006-5998 A | 1/2006 |
| JP | 2006-54979 A | 2/2006 |
| JP | 2006-113155 A | 4/2006 |
| JP | 2006-113874 A | 4/2006 |
| JP | 2006-304529 A | 11/2006 |
| WO | WO 2006/059459 A | 6/2006 |
| WO | WO 2007/013349 A1 | 2/2007 |

OTHER PUBLICATIONS

U.S. Appl. No. 12/082,947, filed Apr. 15, 2008, Entitled "Driving Device Capable of Improving a Shock and Vibration Resistance Thereof" Inventor: Nishiyama et al.

U.S. Appl. No. 12/082,948, filed Apr. 15, 2008, Entitled "Driving Device Capable of Transferring Vibrations Generated by an Electro-Mechanical Transducer to a Vibration Friction Portion with a High Degree of Efficiency" Inventor: Yamada et al.

U.S. Appl. No. 12/148,252, filed Apr. 17, 2008, Entitled "Driving Device Having Suitable Stationary Member as Material" Inventor: Yamada et al.

U.S. Appl. No. 12/148,257, filed Apr. 17, 2008, Entitled "Driving Device Capable of Reducing Height Thereof" Inventor: Yamada et al.

U.S. Appl. No. 12/148,793, filed Apr. 22, 2008, Entitled "Position Detecting Device Capable of Improving Detection Accuracy" Inventor: Tanaka et al.

Notice of Allowance dated Aug. 11, 2009, issued in related U.S. Appl. No. 12/082,939.

Notice of Allowance dated Aug. 7, 2009, issued in related U.S. Appl. No. 12/082,948.

Office Action dated Mar. 12, 2009, issued in related U.S. Appl. No. 12/082,947.

Office Action dated May 14, 2009, issued in related U.S. Appl. No. 12/148,793.

Extended European Search Report dated Nov. 4, 2009 issued in counterpart European Appln. No. 08154796.0 of related U.S. Appl. No. 10/148,257.

Extended European Search Report dated Sep. 1, 2009 (8 pages), issued in European Application Serial No. 08154734.1 (which is a counterpart of related U.S. Appl. No. 12/082,948).

Extended European Search Report dated Sep. 9, 2008 issued in European Application No. 08154985.9-2213 (which is a counterpart of related U.S. Appl. No. 12/148,793).

Extended European Search Report and Written Opinion dated Sep. 4, 2009 issued in counterpart European Application No. 08 15 4797. (6 pages).

Non-final Office Action dated Sep. 22, 2009 issued in related U.S. Appl. No. 12/148,252. (13 pages).

Extended European Search Report and Written Opinion dated Aug. 31, 2009 issued in a counterpart European application No. 08 15 4485 of related U.S. Appl. No. 12/082,947. (8 pages).

Extended European Search Report and Written Opinion dated Sep. 3, 2009 issued in a counterpart European application No. 08 15 4774 of related U.S. Appl. No. 12/148,252. (9 pages).

* cited by examiner

METHOD OF DRIVING A DRIVING DEVICE

This application is based upon and claims the benefit of priority from Japanese Patent Application JP 2007-112090, filed on Apr. 20, 2007, the disclosure of which is incorporated herein in its entirety by reference.

BACKGROUND OF THE INVENTION

This invention relates to a driving device (a linear actuator) and, in particular, to a driving method for driving a driving device where an electro-mechanical transducer such a piezoelectric element is used as a driving source of the driving device (the linear actuator).

Previously, linear actuators (driving devices) using electro-mechanical transducers such as piezoelectric elements, electrostrictive elements, magnetostrictive elements, or the like are used as auto-focus actuators or zoom actuators for use in cameras.

By way of illustration, Japanese Patent No. 2633066 (JP-B 2633066) (which will be also called a first patent document), which corresponds to U.S. Pat. No. 5,225,941, discloses a driving device comprising a driving rod frictionally engaged with a lens barrel, a piezoelectric element disposed in contact with the driving rod, and a leaf spring for bringing the driving rod into frictional engagement with the lens barrel. That is, the driving rod is bonded to an end of the piezoelectric element in an expansion direction. The lens barrel is movably supported to the driving rod. The leaf spring produces friction between the driving rod and the lens barrel. In the driving device disclosed in JP-B 2633066, a voltage is applied to the piezoelectric element so as to make a speed of expansion of the piezoelectric element different from a speed of contraction thereof.

In addition, Japanese Patent No. 3218851 (JP-B 3218851) (which will be also called a second patent document), which corresponds to U.S. Pat. No. 5,589,723, discloses a driving apparatus comprising a piezoelectric element, a driving member (a driving shaft), coupled to the piezoelectric element, for extending in an expansion direction of the piezoelectric element, and a driven member (a moving member, a lens barrel) having a friction member frictionally coupled to the driving member (the driving shaft). The driving apparatus in JP-B 3218851 drives the lens barrel by devising a driving signal applied to the piezoelectric element.

Japanese Unexamined Patent Application Publication No. H9-191665 (JP-A 9-191665) (which will be also called a third patent document), which corresponds to U.S. Pat. No. 5,890,391, discloses a linear drive mechanism using an electro-mechanical transducer which is insensitive to elastic deformation of a constituent member. The linear driving mechanism disclosed in JP-A 9-191665 comprises the electro-mechanical transducer, a working member which is fixedly connected to the electro-mechanical transducer and which displaces with the electro-mechanical transducer, a driving member frictionally coupled to the working member, a driven member coupled to the driving member, and a driving pulse generating arrangement for causing expansion/contraction displacement to the electro-mechanical transducer. In JP-A 9-191665, an internal barrel is integratedly and fixedly attached to a fixed lens barrel. The internal barrel has extensions which are formed in a radial direction on part of the internal barrel. A drive shaft (a moving portion) arranged parallel to an optical axis is supported by bearings of the extensions so as be movable in the optical axis direction. A piezoelectric element (the electro-mechanical transducer) is disposed between the working member (a vibration friction portion) and the extension of the internal barrel. The top half of the working member touches the drive shaft and a pad is installed on the bottom half of the working member and exerts a force toward the drive shaft via a spring, such that the pad touches the bottom half of the working member. The working member and the pad are friction-bonded to the drive shaft via a suitable friction force. By generating expansion/contraction displacements having different rates in the thickness direction of the piezoelectric element, the working member is displaced, and the drive shaft is driven by friction contact with the working member together with a lens holder frame serving as the driven member.

Japanese Unexamined Patent Application Publication No. 2006-304529 (JP-A 2006-304529) (which will be also called a fourth patent document) discloses a high-performance drive device whose cost and weight can be reduced in comparison with a structure with a metal material, and for which a moving member of high rigidity is used without deteriorating the speed of movement and a drive force. In the drive device disclosed in JP-A 2006-304529, the moving member is formed with a liquid crystal polymer including carbon fibers. The drive device disclosed in JP-A 2006-304529 comprises a piezoelectric element for expanding and contracting in response to an applied voltage, a drive shaft (a vibration friction portion) fixed to one end of the piezoelectric element in an expansion/contraction direction, the moving member (a moving portion) which is slidably and frictionally engaged with the drive shaft, and a weight (a stationary member) connected to another end of the piezoelectric element in the expansion/contraction direction. By vibrating the drive shaft by changing a speed or an acceleration of the piezoelectric element in the expansion/contraction direction, the drive device moves the moving member (the moving portion) along the drive shaft (the vibration friction portion).

Furthermore, Japanese Patent No. 3002890 (JP-B 3002890) (which will be also called a fifth patent document) discloses an ultrasonic linear motor which is simple in structure and which comprises a simple driving circuit. The ultrasonic linear motor disclosed in JP-B 3002890 comprises a fixed base (a stationary member), a piezoelectric element (an electro-mechanical transducer), a frictional member (a vibration friction portion), and a moving element (a moving portion). The electro-mechanical transducer has one end secured to the fixed base and another end mounted with the frictional member extending laterally over the piezoelectric element. The piezoelectric element carries out, in an expansion/contraction direction, an expansion/contraction motion which makes the frictional member an expansion/contraction motion. The moving element is movable in parallel with the expansion/contraction direction of the piezoelectric element. The moving element is brought into pressure contact with the frictional member. The piezoelectric element is applied with a voltage having a saw-tooth waveform so that moving speeds of to-and-fro movements are different from each other in the expansion/contraction motion.

FIG. 10 is a waveform chart for use in describing a related art driving method of the driving devices disclosed in the first through the fifth patent documents. In FIG. 10, the abscissa represents a time instant and the ordinate represents a displacement. In FIG. 10, Wd(v) represents a displacement waveform of the vibration friction portion and Wd(m) represents a displacement waveform of the moving portion. Generally, the related art driving method comprises changing speeds of vibrations of the electro-mechanical transducer on expanding and on contracting, making the vibration friction portion a saw-tooth displacement, and moving the moving portion.

In order to obtain the saw-tooth displacement to the vibration friction portion, the electro-mechanical transducer is applied with the voltage having the saw-tooth waveform. Alternatively, by applying a voltage having a rectangular wave to the electro-mechanical transducer, it is necessary to obtain the saw-tooth displacement to the vibration friction portion due to a characteristic of a transfer function which is determined by structure of the driving device. Therefore, the structure of the driving device is closely related to a frequency where the saw-tooth displacement is obtained to the vibration friction portion.

However, in a method of producing a difference between displacement speeds of the vibration friction portion on expanding and on contracting the electro-mechanical transducer such as a related art driving method of the driving device, it may be difficult to obtain displacements having different speeds to the vibration friction portion caused by the structure of the driving device.

SUMMARY OF THE INVENTION

It is therefore an exemplary object of the present invention to provide a driving method for a driving device which is capable of moving a moving portion in a case where displacements having different speeds are not obtained to a vibration friction portion on expanding and on contracting an electro-mechanical transducer due to limitations on structure of the driving device.

Other objects of this invention will become clear as the description proceeds.

On describing the gist of an exemplary aspect of this invention, it is possible to be understood that a driving method is for driving a driving device which includes an electro-mechanical transducer having first and second end portions opposite to each other in an expansion/contraction direction, a stationary member coupled to the first end portion of the electro-mechanical transducer, a vibration friction portion mounted to the second end portion of the electro-mechanical transducer, and a moving portion frictionally coupled to the vibration friction portion. The moving portion is movable in the expansion/contraction direction of the electro-mechanical transducer. According to the exemplary aspect of this invention, the driving method includes equalizing a constant expanding speed of the electro-mechanical transducer with a constant contracting speed of the electro-mechanical transducer, and setting a constant rest time interval after one of contraction of the electro-mechanical transducer and expansion of the electro-mechanical transducer, thereby moving the moving portion in one of an expansion direction and a contraction direction of the electro-mechanical transducer.

DESCRIPTION OF THE PREFERRED EMBODIMENTS

Figure 1:
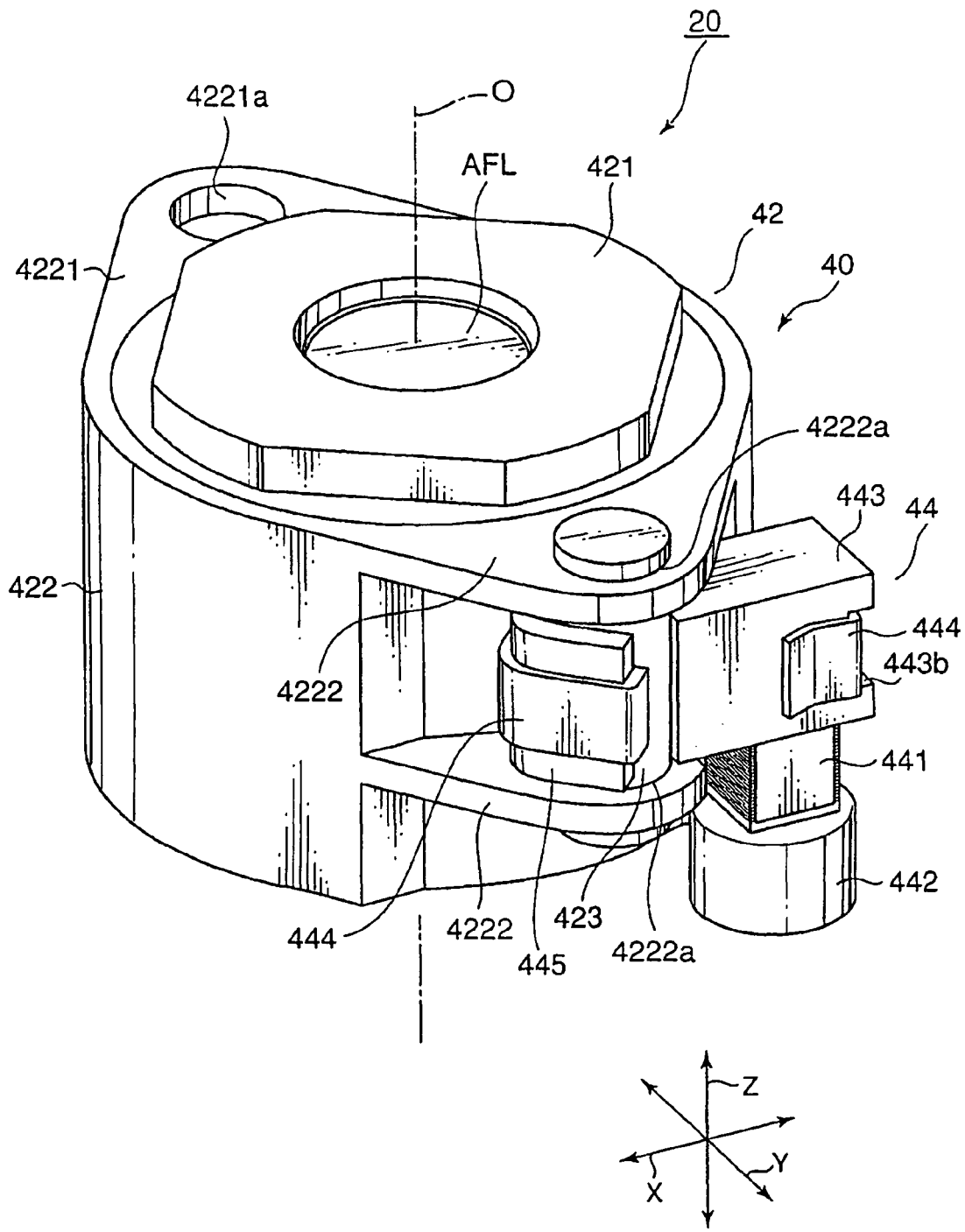
FIG. 1 is an external perspective view showing a driving device to which a driving method according to an exemplary embodiment of this invention is applicable.

FIG. 1 is an external perspective view of a driving device 20 to which a driving method according to a first exemplary embodiment of this invention is applicable. Herein, in the manner shown in FIG. 1, an orthogonal coordinate system (X, Y, Z) is used. In a state illustrated in FIG. 1, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIG. 1, the up-and-own direction Z is a direction of an optical axis O of a lens.

The driving device 20 is covered with a cabinet (not shown). The cabinet includes a cap-shaped upper cover (not shown) and a lower base (not shown). On the lower base of the cabinet, a stationary member (a weight) 442 which will later be described is mounted. The upper cover has an upper surface comprising a cylinder portion (not shown) having a center axis which is the optical axis O.

On the other hand, although illustration is not made, the lower base had a central portion in which an image pickup device disposed on a substrate is mounted. The image pickup device picks up a subject image formed by an movable lens (which will later be described) to convert it into an electric signal. The image pickup device may, for example, comprise a CCD (charge coupled device) type image sensor, a CMOS (complementary metal oxide semiconductor) type image sensor, or the like.

The illustrated driving device 20 comprises an auto-focus lens driving unit 40.

In the cabinet, a guide shaft (not shown) is disposed at a left and back side. The guide shaft extends in parallel with the optical axis O. The guide shaft has an upper end which is fixed to the upper surface of the upper cover of the cabinet and a lower end which is fixed to the lower base of the cabinet. With the optical axis O sandwiched, a rod-shaped moving portion (a movable shaft) 423, which will later be described, is disposed at a right and front side which is opposite side with respect to the guide shaft. That is, the guide shaft and the moving shaft 423 are disposed at positions which are rotationally symmetric about the optical axis O.

The auto-focus lens driving unit 40 comprises a lens movable portion 42 and a lens driving portion 44. The lens movable portion 42 includes a lens holding frame 421 for holding an auto-focus lens AFL which is the movable lens. The lens holding frame 421 is fixed on an upper portion of a movable barrel 422 having a substantially cylindrical shape. The movable barrel 422 comprises a pair of extending portions (however, an upper side thereof is only illustrated in FIG. 1) 4221 which extend in a radial direction outwards at the left and back side. The pair of extending portions 4221 have through holes 4221a through which the above-mentioned guide shaft passes. In addition, the movable barrel 422 comprises a pair of extending portions 4222 which extend in the radial direction outwards at the right and front side. The pair of extending portions 4222 have fitting holes 4222a through which the rod-shaped movable shaft 423 passes and to which the rod-shaped moving shaft 423 is fixed. With this structure, the lens movable portion 42 is movable in the direction of the optical axis O with respect to the cabinet.

The lens driving portion 44 slidably supports the lens movable portion 42 in the direction of the optical axis O and drives the lens movable portion 42 in the manner which will later be described.

Figure 2:
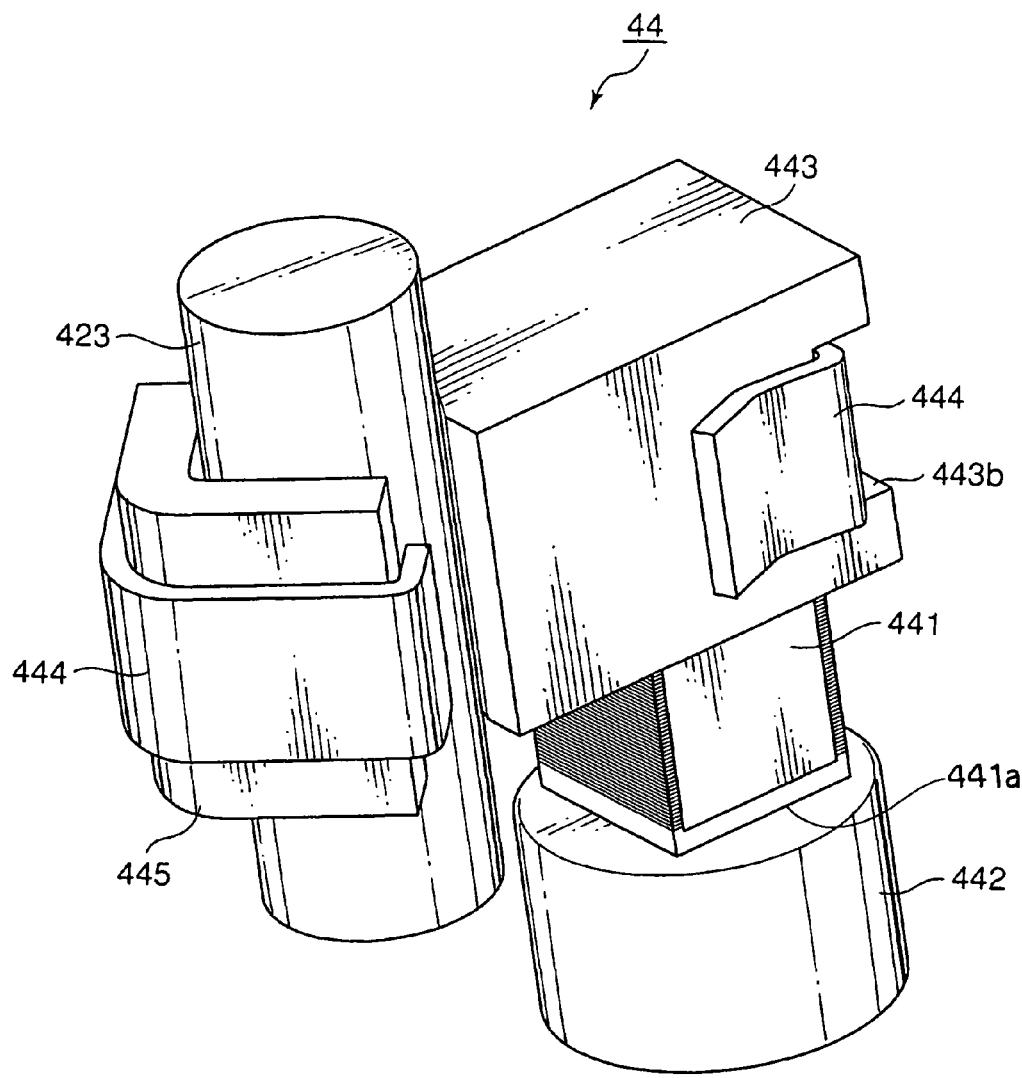
FIG. 2 is a perspective view showing a lens driving portion of the driving device illustrated in FIG. 1 together with a rod-shaped moving shaft.
Figure 3:
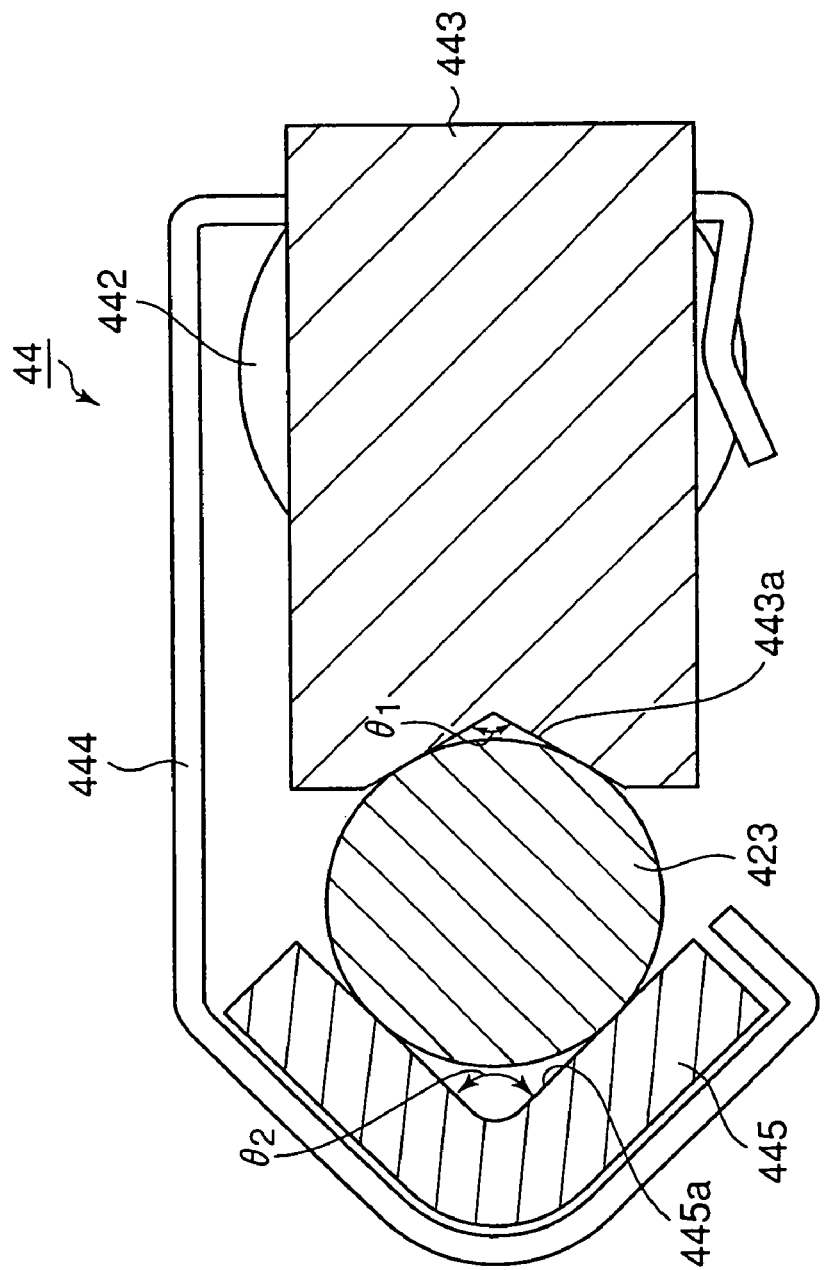
FIG. 3 is a plan view showing the lens driving portion of the driving device illustrated in FIG. 2 together with the rod-shaped moving shaft.
Figure 4:
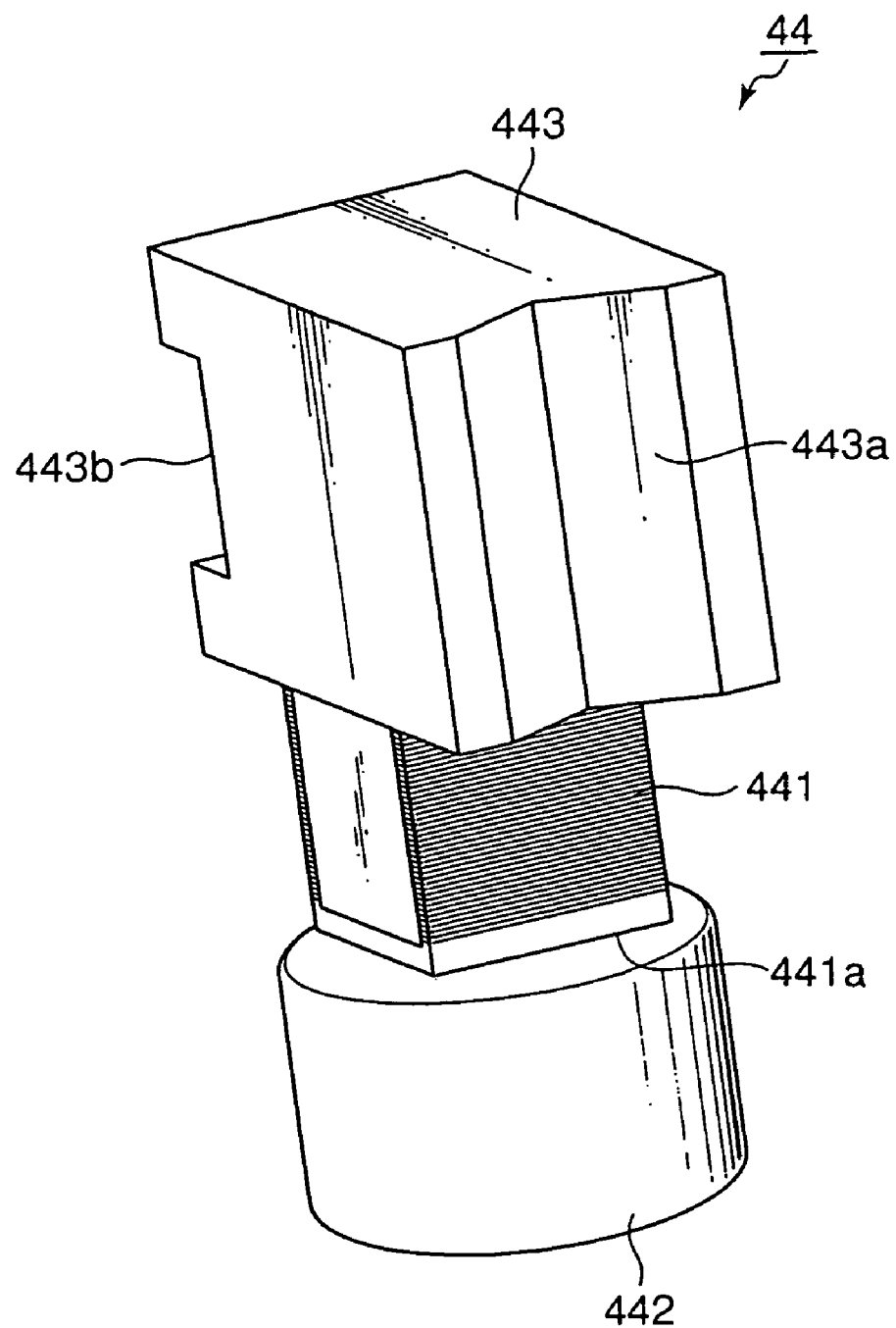
FIG. 4 is a perspective view showing a main portion of the lens driving portion illustrated in FIG. 2.

Referring to FIGS. 2 through 4 in addition to FIG. 1, the description will proceed to the lens driving portion 44 of the auto-focus lens driving unit 40. FIG. 2 is a perspective view showing the lens driving portion 44 of the auto-focus lens driving unit 40 together with the rod-shaped moving shaft 423. FIG. 3 is a plan view showing the lens driving portion 44 of the auto-focus lens driving unit 40 together with the rod-shaped moving shaft 423. FIG. 4 is a perspective view showing a main portion of the lens driving portion 44.

Figure 5:
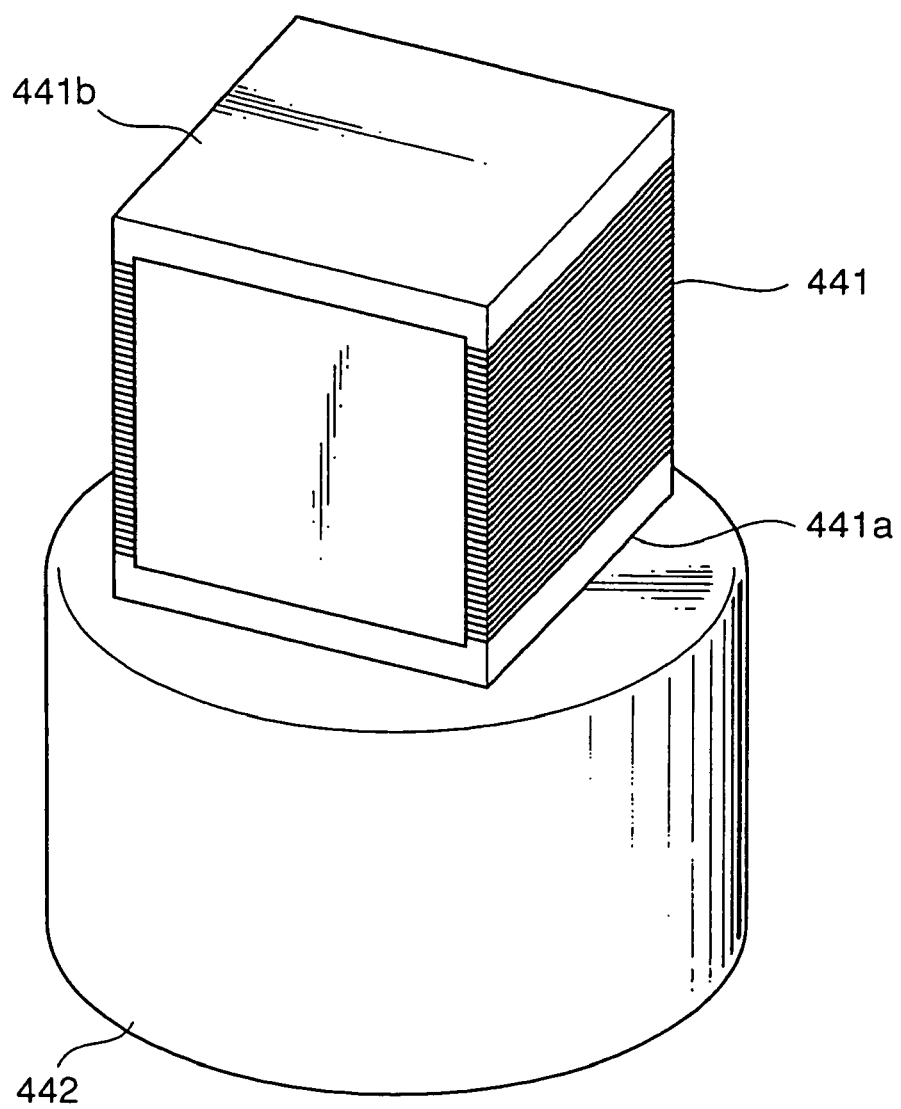
FIG. 5 is a perspective view showing an piezoelectric unit for use in the lens driving portion illustrated in FIG. 2.

The lens driving portion 44 comprises a laminated piezoelectric element 441 serving as an electro-mechanical transducer, the stationary member (the weight) 442, and a vibration friction portion 443. The laminated piezoelectric element 441 expands and contracts in a direction of the optical axis O. The laminated piezoelectric element 441 has a structure where a plurality of piezoelectric layers are laminated in the direction of the optical axis O. As shown in FIG. 5, the laminated piezoelectric element 441 has a first end portion (a lower end portion) 441a and a second end portion (an upper end portion) 441b which are disposed to each other in the expansion/contraction direction. The stationary member (the weight) 442 is coupled to the first end portion (the lower end portion) 441a of the laminated piezoelectric element 441 using an adhesive agent or the like. The vibration friction portion 443 is mounted to the second end portion (the upper end portion) 441b of the laminated piezoelectric element 441 using the adhesive agent or the like. Although the vibration friction portion 443 is directly coupled to the second end portion 441b of the laminated piezoelectric element 441 in the example being illustrated, any member may be sandwiched between the vibration friction portion 443 and the second end portion 441b of the laminated piezoelectric element 441.

In addition, as shown in FIG. 5, a combination of the laminated piezoelectric element 441 and the static member 442 is called an piezoelectric unit.

The rod-shaped moving shaft 423 is frictionally coupled to the vibration friction portion 443. As shown in FIGS. 3 and 4, the vibration friction portion 443 has a groove (a friction engagement surface) 443a which is a V-shape in cross section at a friction coupling portion between the vibration friction portion 443 and the rod-shaped moving shaft 423.

The lens driving portion 44 comprises a spring 444 for pressing (urging) the rod-shaped moving shaft 423 against the vibration friction portion 443. That is, the spring 444 serves as an urging arrangement which is fixed to the vibration friction portion 443 and which generates a pressing force for pressing the moving shaft 423. Between the spring 444 and the rod-shaped moving shaft 423, a pad 445 having a V-shaped structure is sandwiched. The pad 445 is disposed so as to be opposed to the vibration friction portion 443 with the moving shaft 423 sandwiched therebetween. In the manner which is similar to the vibration friction portion 443, the pad 445 also has a groove 445a which is a V-shape in cross section at a contact portion between the pad 445 and the rod-shaped moving shaft 423. The vibration friction portion 443 has a groove 443b for holding the spring 444. The spring 444 has a first end portion which is engaged with the vibration friction portion 443 at the groove 443b and a second end portion which extends towards the moving shaft 423. Therefore, the vibration friction portion 443 and the pad 445 are pressed against the rod-shaped moving shaft 423 by the spring 444. As a result, the rod-shaped moving shaft 423 is frictionally coupled to the vibration friction portion 443 with stability.

More specifically, the pad 445 is sandwiched between the moving portion 423 and the spring 444. The pad 445 is for preventing the pressing force of the spring 444 from degrading due to the wearing away of friction thereof and for preventing the friction force from changing due to wearing away of friction of the spring 444. In addition, in order to prevent the pad 444 from wearing way of friction thereof, the pad 444 may desirably have a smoothed surface. This is purpose, it is desirable that the pad 444 may be made of a material which is one selected from the group consisting of firm metal, resin, and a fiber-reinforced resin composite.

In addition, in the vibration friction portion 443, a frictionally coupled portion between the vibration friction portion 443 and the moving portion 423 has the V-shaped groove 443a in cross section. Inasmuch as the V-shaped groove 443a of the vibration friction portion 443 and the moving portion 423 come in contact with each other in line contact of two straight liens, advantages according to the driving device 20 are that the frictionally coupled portion is put into a stable contact state to obtain friction driving having good reproducibility, and it is possible to enhance rectilinear mobility of the moving portion 423 as a single-shaft mobile unit. In addition, it is desirable that the V-shaped groove 443a of the vibration friction portion 443 has a first angle $\theta_1$ which lies in a range of 30 degrees, inclusive, to 180 degrees, exclusive.

Furthermore, the pad 445 has a V-shaped structure having the V-shaped groove 445a in cross section. Inasmuch as the V-shaped groove 445a of the pad 445 and the moving portion 423 come in contact with each other in line contact of two straight liens, advantages according to the driving device 20 are that the frictionally coupled portion is put into a stable contact state to obtain friction driving having good reproducibility, and it is possible to enhance rectilinear mobility of the moving portion 423 as the single-shaft mobile unit. In addition, it is desirable that the V-shaped groove 445a of the pad 445 has a second angle $\theta_2$ which lies in a range of 30 degrees, inclusive, to 180 degrees, exclusive.

The vibration friction portion 443 and the pad 445 are pressed against the moving portion 423 by the spring 444. As a result of this, inasmuch as the V-shaped groove 443a of the vibration friction portion 443 and the V-shaped groove 445a of the pad 445 are pressed against the moving portion 423, it is possible to make three parts (the moving portion 423, the vibration friction portion 443, and the pad 445) stable line contact. In addition, it is desirable that the pressing force of the spring 444 lies in a range between 5 and 100 gf, both inclusive.

The lens driving portion 44 and the lens moving portion 42 are disposed in parallel with each other in the optical axis O as shown in FIG. 1. Accordingly, it is possible to lower a height of the auto-focus lens driving unit 40. As a result, it is possible to also lower a height of the driving device 20.

Now, the description will proceed to the laminated piezoelectric element 441. The laminated piezoelectric element 441 has a rectangular parallelepiped shape having an element size of 0.9 mm×0.9 mm×1.5 mm. The piezoelectric material is made of a material having a low Qm such as lead-zirconate-titanate (PZT). The laminated piezoelectric element 441 is manufactured by alternately laminating the piezoelectric materials each having a thickness of 20 microns and the internal electrodes each having a thickness of 2 microns in a corn fashion by fifty layers. In addition, the laminated piezoelectric element 441 has the effective internal electrode size of 0.6 mm×0.6 mm. In other wards, at a peripheral portion positioned the outside of the effective internal electrode of the laminated piezoelectric element 441, there is a ring-shaped dead area (clearance) of a width of 0.15 mm.

Inasmuch as the height H of the frictionally coupled portion (the length of the vibration friction portion 443 in the sliding direction in contact with the moving portion 423) is set at 1.15 mm or less, it is possible to make the moving speed of the moving portion 423 fast and to reduce the height of the driving device 20.

Figure 6A:
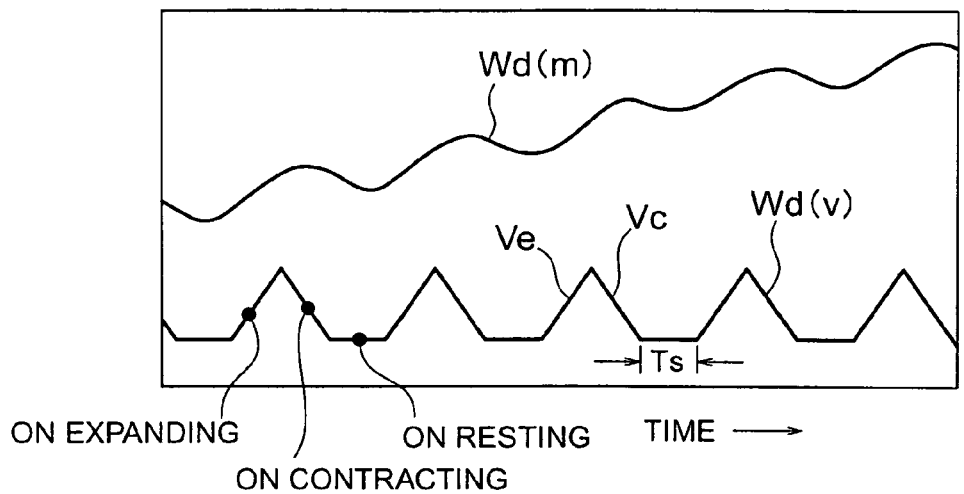
FIG. 6A is a waveform chart for use in describing the driving method according to the exemplary embodiment of this invention that shows a displacement waveform of a vibration friction portion and a displacement waveform of a moving portion in a case where it makes the moving portion move in a plus (+) direction (upwards, in an expansion direction of an electro-mechanical element)
Figure 6B:
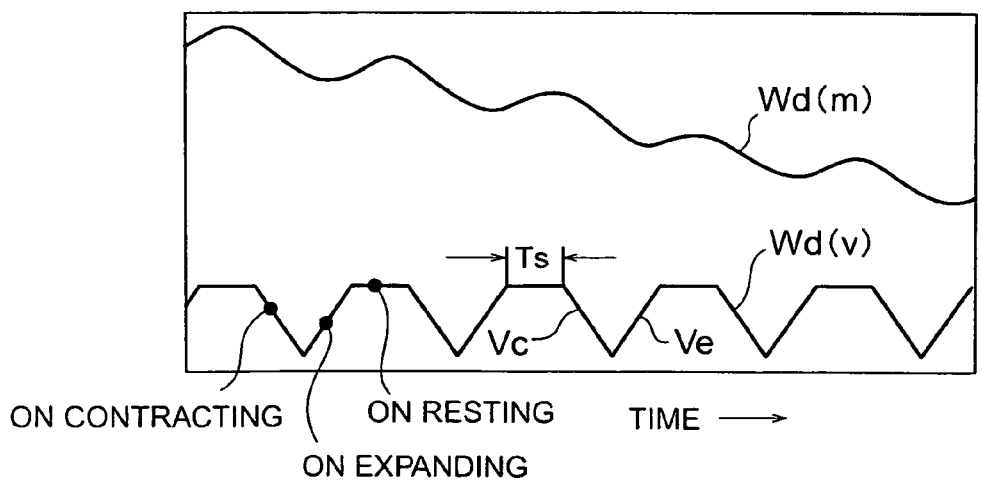
FIG. 6B is a waveform chart for use in describing the driving method according to the exemplary embodiment of this invention that shows the displacement waveform of the vibration friction portion and the displacement waveform of the moving portion in a case where it makes the moving portion move in a minus (−) direction (downwards, in a contraction direction of the electro-mechanical element)

Referring now to FIGS. 6A and 6B, the description will proceed to a driving method according to an exemplary embodiment of this invention. FIG. 6A shows a displacement waveform Wd(v) of the vibration friction portion 443 and a displacement waveform Wd(m) of the moving portion 423 in a case where it makes the moving portion 423 move in a plus (+) direction (upwards, in an expansion direction of the electro-mechanical element 441). FIG. 6B shows the displacement waveform Wd(v) of the vibration friction portion 443 and the displacement waveform Wd(m) of the moving portion 423 in a case where it makes the moving portion 423 move in a minus (−) direction (downwards, in a contraction direction of the electro-mechanical element 441).

Referring now FIG. 6A, the description will be made as regards the displacement waveform Wd(v) of the vibration friction portion 443 and the displacement waveform Wd(m) of the moving portion 423 associated therewith in the case where it makes the moving portion 423 in the plus (+) direction (upwards, in the expansion direction of the electro-mechanical transducer 441).

As is apparent from FIG. 6A, the driving method for driving the moving portion 423 in the expansion direction of the electro-mechanical transducer 441 repeats the steps:

a1) expanding the electro-mechanical transducer 441 at a constant expanding speed Ve to make the vibration friction portion 443 displacement upwards (in the expansion direction of the electro-mechanical transducer 441) at the constant expanding speed Ve;

b1) contracting the electro-mechanical transducer 441 at a constant contracting speed Vd to make the vibration friction portion 443 displacement downwards (in the contraction direction of the electro-mechanical transducer 441) at the constant contracting speed Vd; and c1) making the vibration friction portion 443 rest for a constant rest time interval Ts without driving the electro-mechanical transducer 441, where the constant expanding speed Ve is equal to the constant contracting speed Vc.

Under the circumstances, inasmuch as the vibration friction portion 443 is displaced upwards (in the expansion direction of the electro-mechanical transducer 441) at the constant expanding speed Ve caused by expansion of the electro-mechanical transducer 441 at the constant expanding speed Ve at the step a1), the moving portion 423 is displaced upwards associated therewith. Thereafter, although the vibration friction portion 443 is displaced downwards (in the contraction direction of the electro-mechanical transducer 441) at the constant contracting speed Vc because the electro-mechanical transducer 441 contracts at the constant contracting speed Vc at the step b1), slip occurs between the vibration friction portion 443 and the moving portion 423 at acceleration on switching this. As a result, the moving portion 423 cannot immediately follow although the vibration friction portion 443 is displaced downwards at the constant contracting speed Vc and then the moving portion 423 lags and is slightly displaced downwards. Thereafter, inasmuch as the vibration friction portion 443 rests for a constant rest time interval Ts at the step c1), the moving portion 423 also rests.

By repeating the above-mentioned operation, the moving portion 423 gradually moves upwards (in the plus (+) direction, in the expansion direction of the electro-mechanical transducer 441).

Referring now FIG. 6B, the description will be made as regards the displacement waveform Wd(v) of the vibration friction portion 443 and the displacement waveform Wd(m) of the moving portion 423 associated therewith in the case where it makes the moving portion 423 in the minus (−) direction (downwards, in the contraction direction of the electro-mechanical transducer 441).

As is apparent from FIG. 6B, the driving method for driving the moving portion 423 in the contraction direction of the electro-mechanical transducer 441 repeats the steps:

a2) contracting the electro-mechanical transducer 441 at the constant contracting speed Vc to make the vibration friction portion 443 displacement downwards (in the contraction direction of the electro-mechanical transducer 441) at the constant contracting speed Vc;

b2) expanding the electro-mechanical transducer 441 at the constant expanding speed Ve to make the vibration friction portion 443 displacement upwards (in the expansion direction of the electro-mechanical transducer 441) at the constant expanding speed Ve; and c2) making the vibration friction portion 443 rest for the constant rest time interval Ts without driving the electro-mechanical transducer 441.

Under the circumstances, inasmuch as the vibration friction portion 443 is displaced downwards (in the contraction direction of the electro-mechanical transducer 441) at the constant contracting speed Vc caused by contraction of the electro-mechanical transducer 441 at the constant contracting speed Vc at the step a2), the moving portion 423 is displaced downwards associated therewith. Thereafter, although the vibration friction portion 443 is displaced upwards (in the expansion direction of the electro-mechanical transducer 441) at the constant expanding speed Ve because the electro-mechanical transducer 441 expands at the constant expanding speed Ve at the step b2), slip occurs between the vibration friction portion 443 and the moving portion 423 at acceleration on switching this. As a result, the moving portion 423 cannot immediately follow although the vibration friction portion 443 is displaced upwards at the constant expanding speed Ve and then the moving portion 423 lags and is slightly displaced upwards. Thereafter, inasmuch as the vibration friction portion 443 rests for the constant rest time interval Ts at the step c2), the moving portion 423 also rests.

By repeating the above-mentioned operation, the moving portion 423 gradually moves downwards (in the minus (−) direction, in the contraction direction of the electro-mechanical transducer 441).

Figure 7:
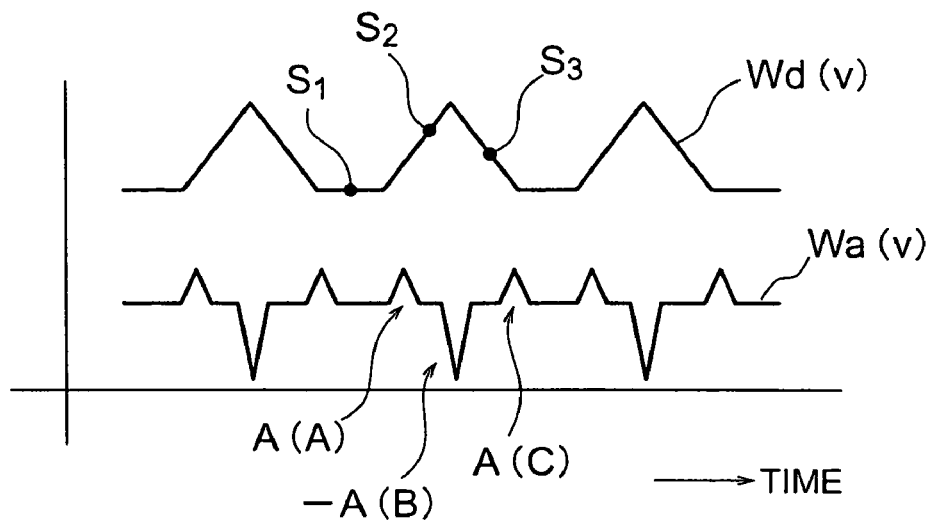
FIG. 7 is a waveform chart showing a displacement waveform of the vibration friction portion and an acceleration waveform thereof on moving the moving portion in the plus (+) direction (upwards)
Figure 8:
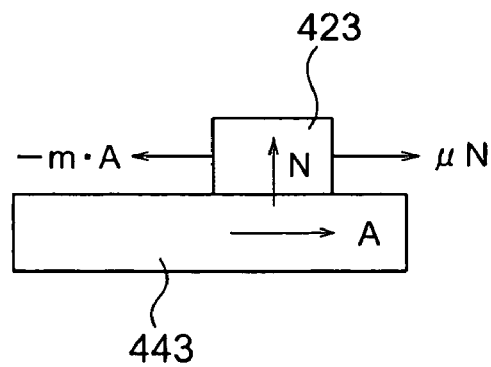
FIG. 8 is a model view in a case of accelerating the vibration friction portion at an acceleration A when the moving portion has mass of m, a normal vertical drag between the vibration friction portion and the moving portion is N, and the coefficient of friction between the vibration friction portion and the moving portion is μ.

In addition, a circuit configuration where it makes the displacement speed of the vibration friction portion 443 equal on expanding and on contracting of the electro-mechanical transducer 441 can be fabricated at a comparatively easy FIG. 7 is a waveform chart showing the displacement waveform Wd(v) of the vibration friction portion 443 and an acceleration waveform Wa(v) thereof on moving the moving portion 423 in the plus (+) direction (upwards, in the expansion direction of the electro-mechanical transducer 441). FIG. 8 is a model view in a case of accelerating the vibration friction portion 443 at an acceleration A when the moving portion 423 has mass of m, a normal drag between the vibration friction portion 443 and the moving portion 423 is N, and the coefficient of friction between the vibration friction portion 443 and the moving portion 423 is μ.

It will be assumed that the acceleration of the vibration friction portion 443 is calculated by the displacement waveform Wd(v) of the vibration friction portion 443 as illustrated in FIG. 7. In this event, three kinds of accelerations occur a first acceleration A(A) acting on changing from a rest state $S_1$ (the step c1)) to an expanded state $S_2$ (the step a1)), a second acceleration −A(B) acting on changing from the expanded state $S_2$ (the step a1)) to a contracted state $S_3$ (the step b1)), and a third acceleration A(C) acting on changing from the contracted state $S_3$ (the step b1)) to the rest state $S_1$ (the step c1)). The second acceleration −A(B) has a magnitude which is larger than those of the first and the third accelerations A(A) and A(C).

As shown in FIG. 8, it will be assumed that the mass of the moving portion 423 is m, the normal drag between the vibration friction portion 443 and the moving portion 423 is N, and the coefficient of friction between the vibration friction portion 443 and the moving portion 423 is μ.

In a state, in view of the vibration friction portion 443 accelerating at the first acceleration A(A), an inertial force −mA(A) acts on the moving portion 423. If a friction force μN acting from the vibration friction portion 443 to the moving portion 423 exceeds the inertial force −mA(A), the vibration friction portion 443 and the moving portion 423 accelerate collectively.

Subsequently, in view of the vibration friction portion 443 changes a displacement direction by the second acceleration −A(B), an inertial force mA(B) and a friction force −μN act on the moving portion 423. If the inertial force mA(B) exceeds the friction force −μN, slop occurs between the vibration friction portion 443 and the moving portion 423.

Finally, in view of the vibration friction portion 443 makes rest by the third acceleration A(C), an inertial force −mA(C) and the friction force μN act on the moving portion 423. If the friction force μN exceeds the inertial force −mA(C), the moving portion 423 rests together with the vibration friction portion 443.

Among a series of operations which is described above, the largest inertial force acts in view of the vibration friction portion on the second acceleration −A(B).

Accordingly, if a magnitude of each of the constant expanding speed Ve and the constant contacting speed Vc is set so that the moving portion 423 does not substantially slide or slides little on the vibration friction portion 423 at the first and the third accelerations A(A) and A(C) and that the moving portion 423 slides on the vibration friction portion 423 at the second acceleration −A(B), it is possible to drive the moving portion 423 upwards (in the expansion direction of the electro-mechanical transducer 441).

Although the description is made as regards the displacement and the acceleration of the vibration friction portion 443 on moving the moving portion 423 in the plus (+) direction (upwards, in the expansion direction of the electro-mechanical transducer 441), a displacement and an acceleration of the vibration friction portion 443 on moving the moving portion 423 in the minus (−) direction (downwards, in the contraction direction of the electro-mechanical transducer 441 are similar.

Figure 9:
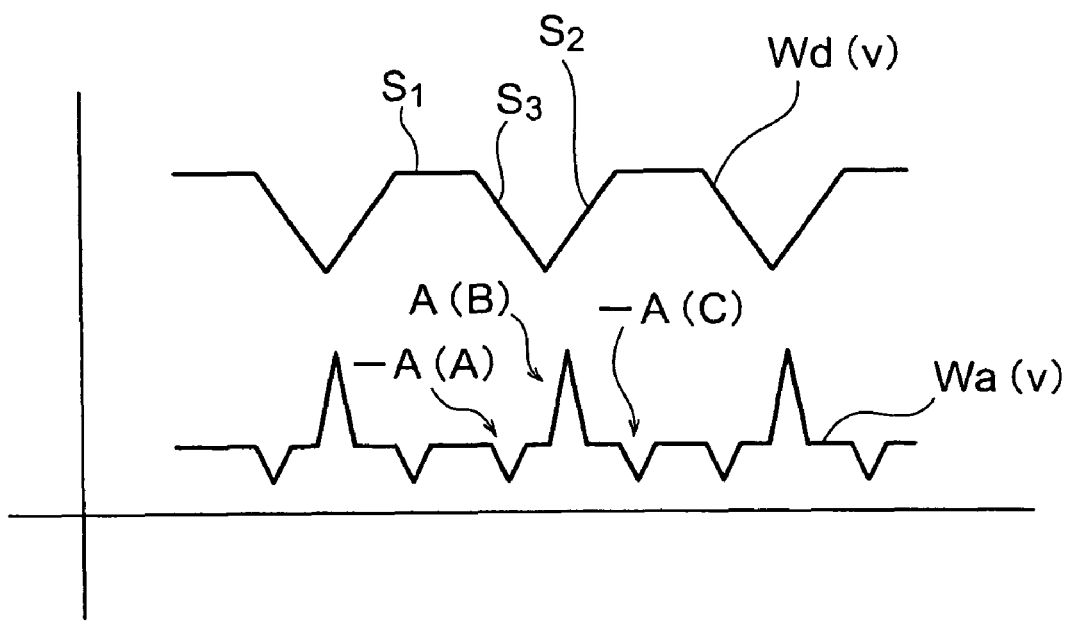
FIG. 9 is a waveform chart showing a displacement waveform of the vibration friction portion and an acceleration waveform thereof on moving the moving portion in the minus (−) direction (downwards)
Figure 10:
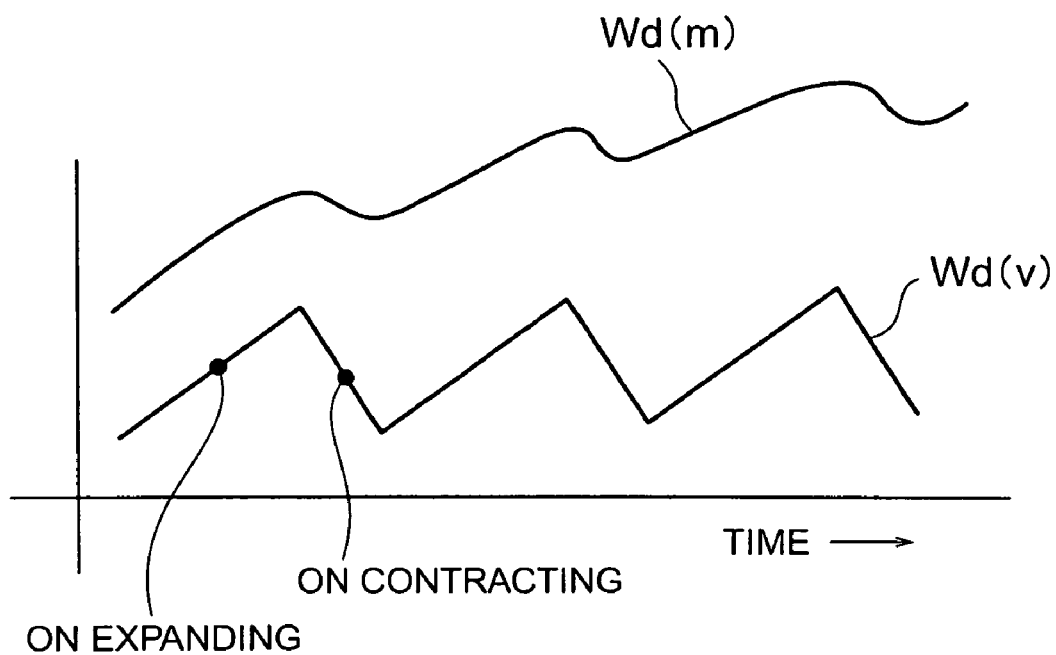
FIG. 10 is a waveform chart for use in describing a related art driving method for a driving device that shows a displacement waveform of a vibration friction portion and a displacement waveform of a moving portion.

FIG. 9 is a waveform chart showing the displacement waveform Ws(v) of the vibration friction portion 443 and the acceleration waveform Wa(v) thereof on moving the moving portion 423 in the minus (−) direction (downwards, in the contraction direction of the electro-mechanical transducer 441).

In this event, three kinds of accelerations occur: a first acceleration −A(A) acting on changing from the rest state $S_1$ (the step c2)) to the contracted state $S_3$ (the step a2)), a second acceleration A(B) acting on changing from the contracted state $S_3$ (the step a2)) to the expanded state $S_2$ (the step b2)), and a third acceleration −A(C) acting on changing from the expanded state $S_2$ (the step b2)) to the rest state $S_1$ (the step c2)). The second acceleration A(B) has a magnitude which is larger than those of the first and the third accelerations −A(A) and −A(C).

Accordingly, if a magnitude of each of the constant expanding speed Ve and the constant contracting speed Vc is set so that the moving portion 423 does not substantially slide or slides little on the vibration friction portion 423 at the first and the third accelerations −A(A) and −A(C) and that the moving portion 423 slides on the vibration friction portion 423 at the second acceleration A(B), it is possible to drive the moving portion 423 downwards (in the contraction direction of the electro-mechanical transducer 441).

In the manner which is apparent from the above-description, according to the driving method for the driving device 20 according to the exemplary embodiment of this invention, it is possible to drive the moving portion 423 in a case where displacements having different speeds are not obtained to the vibration friction portion 443 on expanding and on contracting the electro-mechanical transducer 441 due to limitations on structure of the driving device 20.

In the exemplary aspect of this invention, on driving the moving portion in the expansion direction of the electro-mechanical transducer, the driving method includes the steps of a1) expanding the electro-mechanical transducer at the constant expanding speed to make the vibration friction portion displace in the expansion direction of the electro-mechanical transducer at the constant expanding speed, of b1) contracting the electro-mechanical transducer at the constant contracting speed to make the vibration friction portion displace in the contraction direction of the electro-mechanical transducer at the constant contracting speed, and of c1) making the vibration friction portion rest for the constant rest time interval without driving the electro-mechanical transducer.

The driving method repeats the step a1) through the step c1). In this event, each of the constant expanding speed and the constant contracting speed has a magnitude so that the moving portion does not substantially slide over the vibration friction portion at an acceleration acting on changing from the step c1) to the step a1) and at an acceleration acting on changing from the step b1) to the step c1), and so that the moving portion slides over the vibration friction portion at an acceleration acting on changing from the step a1) from the step b1).

In the exemplary aspect of this invention, on driving the moving portion in the contraction direction of the electro-mechanical transducer, the driving method includes the steps of a2) contracting the electro-mechanical transducer at the constant contracting speed to make the vibration friction portion displace in the contraction direction of the electro-mechanical transducer at the constant contracting speed, of b2) expanding the electro-mechanical transducer at the constant expanding speed to make the vibration friction portion displace in the expansion direction of the electro-mechanical transducer at the constant expanding speed, and of making the vibration friction portion rest for the constant rest time interval without driving the electro-mechanical transducer. The driving method repeats the step a2) through the step c2). In this event, each of the constant expanding speed and the constant contracting speed has a magnitude so that the moving portion does not substantially slide over the vibration friction portion at an acceleration acting on changing from the step c2) to the step a2) and at an acceleration acting on changing from the step b2) to the step c2), and so that the moving portion slides over the vibration friction portion at an acceleration acting on changing from the step a2) from the step b2).

An exemplary advantage according to the invention is that it is possible to drive the moving portion in a case where displacements having different speeds are not obtained in the vibration friction portion on expanding and on contracting the electro-mechanical transducer due to limitations on structure of the driving device. This is because the moving portion is driven by equalizing the constant expanding speed of the electro-mechanical transducer with the constant contracting speed of the electro-mechanical transducer and by setting a rest time interval after one of contraction of the electro-mechanical transducer and expansion of the electro-mechanical transducer.

While this invention has been particularly shown and described with reference to exemplary embodiments thereof, the invention is not limited to these embodiments. It will be understood by those of ordinary skill in the art that various changes in form and details may be therein without departing from the spirit and scope of the present invention as defined by the claims. For example, structure of the driving device is not restricted to that of the above-mentioned exemplary embodiment of the invention, the driving device may, for example, be one of those disclosed in the above-mentioned first through fifth patent documents.

What is claimed is:

1. A driving method for a driving device comprising an electro-mechanical transducer having first and second end portions opposite to each other in an expansion/contraction direction, a stationary member coupled to the first end portion of said electro-mechanical transducer, a vibration friction portion mounted to the second end portion of said electro-mechanical transducer, and a moving portion frictionally coupled to said vibration friction portion so as to be movable in the expansion/contraction direction of said electro-mechanical transducer, said driving method driving said moving portion due to expansion/contraction of said electro-mechanical transducer, said driving method comprising:

equalizing a constant expanding speed of said electro-mechanical transducer with a constant contracting speed of said electro-mechanical transducer; and setting a constant rest time interval after one of contraction of said electro-mechanical transducer and expansion of said electro-mechanical transducer, thereby moving said moving portion in one of an expansion direction and a contraction direction of said electro-mechanical transducer, wherein, when driving said moving portion in the expansion direction of said electro-mechanical transducer, said driving method comprises:

a1) expanding said electro-mechanical transducer at the constant expanding speed to make said vibration friction portion displace in the expansion direction of said electro-mechanical transducer at the constant expanding speed;

b1) immediately after performing the expanding, contracting said electro-mechanical transducer at the constant contracting speed to make said vibration friction portion displace in the contraction direction of said electro-mechanical transducer at the constant contracting speed; and c1) immediately after performing the contracting, making said vibration friction portion rest for the constant rest time interval without driving said electro-mechanical transducer, wherein said driving method repeats the above steps a1) through c1), thereby generating, as a drive pulse, a triangular wave pulse with a rest portion.

2. The driving method according to claim 1, wherein each of said constant expanding speed and said constant contracting speed has a magnitude such that:

said moving portion does not substantially slide over said vibration friction portion at an acceleration acting on changing from said step c1) to said step a1) and at an acceleration acting on changing from said step b1) to said step c1); and said moving portion slides over said vibration friction portion at an acceleration acting on changing from said step a1) from said step b1).

3. A driving method for a driving device comprising an electro-mechanical transducer having first and second end portions opposite to each other in an expansion/contraction direction, a stationary member coupled to the first end portion of said electro-mechanical transducer, a vibration friction portion mounted to the second end portion of said electro-mechanical transducer, and a moving portion frictionally coupled to said vibration friction portion so as to be movable in the expansion/contraction direction of said electro-mechanical transducer, said driving method driving said moving portion due to expansion/contraction of said electro-mechanical transducer, said driving method comprising:

equalizing a constant expanding speed of said electro-mechanical transducer with a constant contracting speed of said electro-mechanical transducer; and setting a constant rest time interval after one of contraction of said electro-mechanical transducer and expansion of said electro-mechanical transducer, thereby moving said moving portion in one of an expansion direction and a contraction direction of said electro-mechanical transducer, wherein, when driving said moving portion in the contraction direction of said electro-mechanical transducer, said driving method comprises:

a2) contracting said electro-mechanical transducer at the constant contracting speed to make said vibration friction portion displace in the contraction direction of said electro-mechanical transducer at the constant contracting speed;

b2) immediately after performing the contracting, expanding said electro-mechanical transducer at the constant expanding speed to make said vibration friction portion displace in the expansion direction of said electro-mechanical transducer at the constant expanding speed; and c2) immediately after performing the expanding, making said vibration friction portion rest for the constant rest time interval without driving said electro-mechanical transducer, wherein said driving method repeats the above steps a2) through c2), thereby generating, as a drive pulse, an inverse triangular wave pulse with a rest portion.

4. The driving method according to claim 3, wherein each of said constant expanding speed and said constant contracting speed has a magnitude such that:

said moving portion does not substantially slide over said vibration friction portion at an acceleration acting on changing from said step c2) to said step a2) and at an acceleration acting on changing from said step b2) to said step c2); and said moving portion slides over said vibration friction portion at an acceleration acting on changing from said step a2) from said step b2).

* * * * *